United States Patent [19]
Mizui

[11] Patent Number: 5,832,730
[45] Date of Patent: Nov. 10, 1998

[54] DEVICE AND METHOD FOR SUPPRESSING VIBRATION OF A WORKING MACHINE

[75] Inventor: Seiichi Mizui, Odawara, Japan

[73] Assignee: Komatsu Ltd., Tokyo, Japan

[21] Appl. No.: 696,828

[22] PCT Filed: Feb. 17, 1995

[86] PCT No.: PCT/JP95/00223

§ 371 Date: Oct. 8, 1996

§ 102(e) Date: Oct. 8, 1996

[87] PCT Pub. No.: WO95/22789

PCT Pub. Date: Aug. 24, 1995

[30] Foreign Application Priority Data

Feb. 21, 1994 [JP] Japan .................................. 6-046330

[51] Int. Cl.$^6$ .................................................. F16D 31/02
[52] U.S. Cl. ........................... 60/469; 91/433; 91/361
[58] Field of Search ........................... 60/469; 91/361, 91/363 R, 420, 433

[56] References Cited

U.S. PATENT DOCUMENTS

| | | | |
|---|---|---|---|
| 4,164,167 | 8/1979 | Imai et al. | 91/433 |
| 4,336,745 | 6/1982 | Lund | 91/433 |

FOREIGN PATENT DOCUMENTS

| | | |
|---|---|---|
| 61-23212 | 1/1986 | Japan . |
| 63-12594 | 1/1988 | Japan . |
| 5-163746 | 6/1993 | Japan . |
| 5-58091 | 8/1993 | Japan . |

*Primary Examiner*—F. Daniel Lopez
*Attorney, Agent, or Firm*—Armstrong, Westerman, Hattori, McLeland & Naughton

[57] ABSTRACT

A device and method for suppressing vibration of a working machine in which residual vibration produced immediately after an operation is completed can be suppressed well without degrading the response. The device comprises a working machine acceleration detecting means (11H, 11B), a lever turning degree coefficient calculating means (17) for calculating coefficient in accordance with a lever turning degree, an acceleration compensating value operating means (13) for performing an operation from the acting force calculated from the acceleration of the working machine and a lever turning degree coefficient, and a feedback command means (18) for calculating an acceleration feedback command value from an acceleration compensating value and a lever operation command value and for outputting the acceleration feedback command value to electromagnetic proportional pressure control valves (22, 23).

4 Claims, 4 Drawing Sheets

DEVICE AND METHOD FOR SUPPRESSING VIBRATION OF A WORKING MACHINE

BACKGROUND OF THE INVENTION

1. Field of the Invention

The present invention generally relates to a device and a method for suppressing vibration of a working machine. More particularly, this invention relates to a device and a method for suppressing vibration of a working machine which are suitable for excavators (such as, a hydraulic shovel or the like), a lifting machine (such as, a crane or the like), and industrial equipment, etc., which employ working machines driven by oil pressure.

2. Description of the Relevant Art

Generally, working machines driven by an oil hydraulic actuator generate vibration when the machines are operated such that they are abruptly accelerated. Consequently, the residual vibration after the operation is completed (especially, immediately after the operation is completed) detrimentally influences the operability, ride comfort, etc., of the working machines. The following publications are cited and discussed for explaining the conventional methods and structural arrangements which attempt to suppress the above-discussed vibration.

First, a method for suppressing speed fluctuation by adding speed damping by an acceleration feedback circuit has been known (see, Japanese Patent Application Publication No. 5-58091). According to such method, vibration is suppressed by attaching a pressure sensor to the hydraulic cylinder for driving a working machine, by calculating the thrusting force of the hydraulic cylinder from the value of the pressure sensor, etc. Then, the acceleration compensating value is calculated by multiplying the value subjected to filter processing by the amount of feedback gain, and negative feedback of this signal is performed to an operating lever signal. Other inventions which suppress vibration by using an accelerometer instead of a pressure sensor have been known (see, for example, Japanese Patent Application Laid-Open No. 61-23212).

However, in such method, the acceleration compensating value is calculated by multiplying the amount of acceleration feedback gain which is a specified fixed value. Thus, such method is advantageous in that the response to start and halt a hydraulic cylinder by an operation lever is deteriorated and inefficient when a large acceleration feedback gain suitable for suppressing residual vibration is set. Accordingly, it has been necessary in such method to set the amount of acceleration feedback gain by determining a point of compromise between suppression of residual vibration and response.

In another conventional method, the acceleration of a working machine used in construction equipment etc., which is driven by an oil hydraulic actuator (such as, a hydraulic cylinder or the like) is detected; then, the acceleration compensating value is operated by multiplying such detected value by an output saturated type nonlinear gain. Consequently, the acceleration compensating value is compared to a lever operation command value by an operator, then the larger value is outputted to an electromagnetic proportional pressure control valve, and thereafter, a directional control valve is controlled so as to be in a direction to reduce the residual vibration of an oil hydraulic actuator (see, e.g., Japanese Patent Application Laid-Open No. 5-163746). By the aforementioned structural arrangement, residual vibration can be suppressed with a mere operator's feeling of an ordinary lever operation without deteriorating the response, and thereby resulting in ride comfort being obtained.

However, in work requiring a smaller operation (for example, when a load is lifted down to a position with a specified height by a crane or the like), it is required for the width of residual vibration to be reduced in a short period of time and the precise position to be located. However, such requirements sometimes cannot be met.

SUMMARY OF THE INVENTION

The present invention is provided in order to eliminate the above-discussed disadvantages or drawbacks of the conventional art.

It is thus an object of the present invention to provide a device and a method for suppressing vibration of a working machine in which the operational convenience of the lever which does not detrimentally affect the responsiveness thereof is obtained, and residual vibration produced immediately after the completion of an operation can be suppressed so as to be reduced over a short period of time.

The device for suppressing vibration of a working machine relating to the present invention is provided with a working machine acceleration detecting means for detecting the acceleration of a working machine driven by an oil hydraulic actuator; a lever turning degree coefficient calculating means for calculating a coefficient in accordance with a lever turning degree from a lever operation command value of an operator; an acceleration compensating value operating means for operating an acceleration compensating value from an acting force calculated from a working machine acceleration and a lever turning degree coefficient; and a feedback command means for obtaining an acceleration feedback command value from the acceleration compensating value and the lever operation command value, and for outputting this acceleration feedback command value to an electromagnetic proportional pressure control valve. The aforementioned lever turning degree coefficient may be a coefficient which reaches its maximum at the lever operation command value when the lever is in a neutral position. In the aforementioned structural arrangement, the acceleration compensating value may be the value of the acting force multiplied by the lever turning degree coefficient. Further, in the aforementioned structural arrangement, the acceleration feedback command value may be the value of the lever operation command value from which the aforementioned acceleration compensating value is subtracted. This acceleration feedback command value may be the value with the larger absolute value by comparing the lever operation command value to the acceleration compensating value.

With the aforementioned structural arrangement in which the lever turning degree coefficient corresponds to a lever operation command by an operator and the working machine is controlled by the acceleration feedback command value while considering such lever turning degree coefficient, an operator's feeling in an operation are considered and can be satisfied, and vibration can be suppressed. In addition, the lever turning degree coefficient reaches its maximum when the lever is in a neutral position, and the acceleration compensating value is the value of the acting force multiplied by the lever turning degree coefficient. Consequently, vibration after an operation is completed is efficiently suppressed at its utmost. It is further noted that vibration can be sufficiently suppressed at its utmost in either case when the acceleration feedback command value is the value of the lever operation command value from which the acceleration compensating value is subtracted, or when the acceleration feedback command value is the value having the larger absolute value, between the lever operation command value and the acceleration compensating value.

Thus, in the method of suppressing vibration of a working machine relating to the present invention, the value based on the detected value (such as, acceleration, etc.) of a working machine is the value based on the aforementioned detected value and the lever turning degree coefficient corresponding to the lever operation.

With the aforementioned structural arrangement in which the feedback command value is a value based on a detected value and the lever turning degree coefficient corresponding to a lever operation, vibration can be efficiently suppressed at its utmost, while the response to the operation by an operator is secured.

These and other features of the invention will be understood upon reading of the following description along with the drawings.

DETAILED DESCRIPTION OF THE PREFERRED EMBODIMENTS

Figure 1:
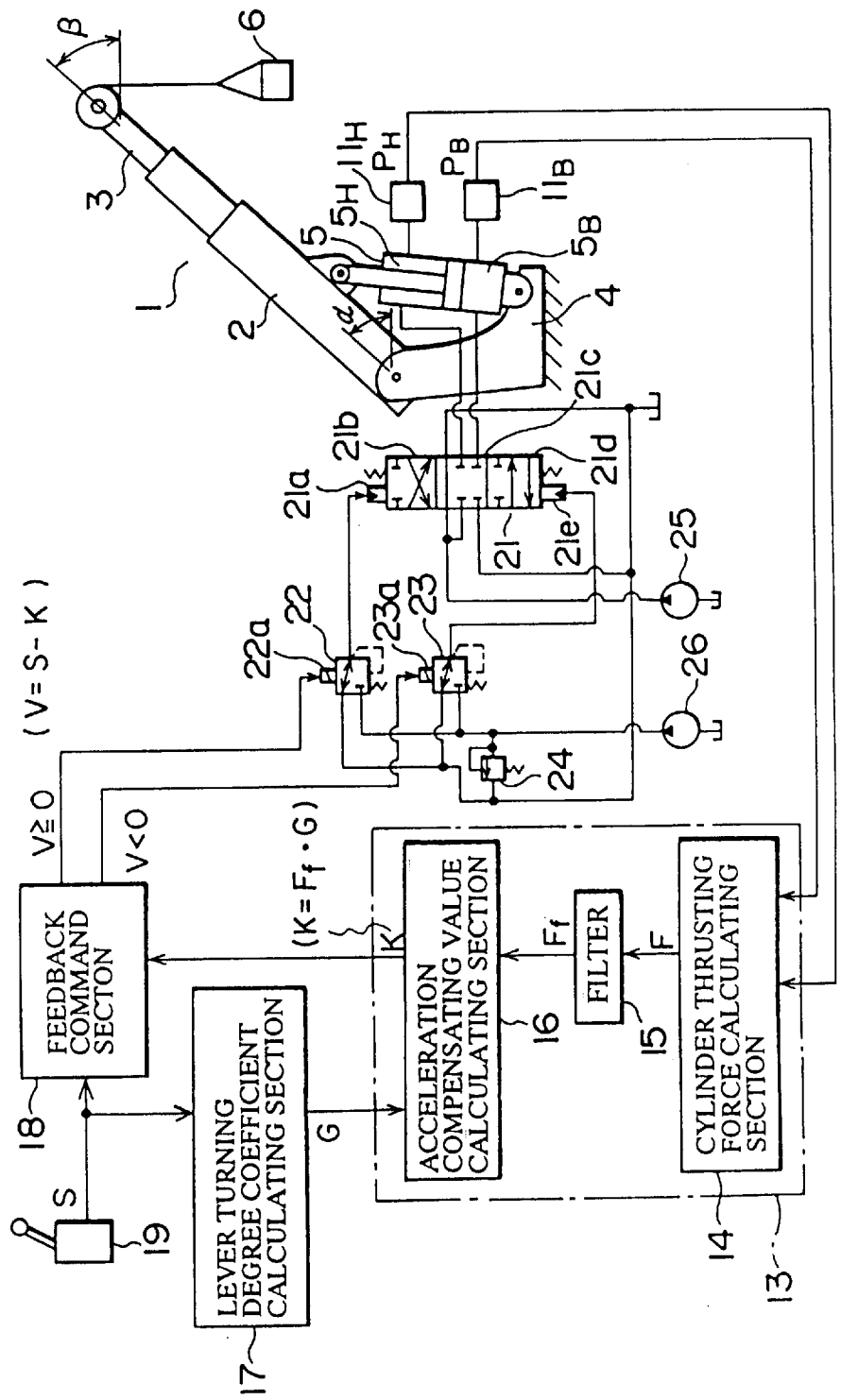
FIG. 1 is a general explanatory view of the device for suppressing vibration of a working machine relating to an embodiment of the present invention.

FIG. 1 is an example applied to a boom which is a working machine of a crane. The structural arrangement shown in FIG. 1 is illustrated as generally having a boom 1, an oil hydraulic driving system for driving the boom 1, and a command control system. The boom 1 is a multi-stage type including a base boom 2, a top boom 3, etc. The base boom 2 is rotatably supported by a frame 4; and the operation for lifting or moving a load 6 is conducted with a rope or the like provided at the endmost portion of the top boom 3.

The oil hydraulic driving system includes a boom cylinder 5 which is one example of an oil hydraulic actuator, a directional control valve 21 for selectively supplying hydraulic oil from a main oil hydraulic pump 25 to the boom cylinder 5 in accordance with a driving direction of the boom 1, electromagnetic proportional pressure control valves 22, 23 (hereinafter, referred to as EPC valves 22, 23) for switching and controlling this directional control valve 21, a pressure regulatory valve 24 for controlling hydraulic oil from a charging pump 26 to the EPC valves 22, 23 to have a specified pressure. The boom cylinder 5 includes a head chamber 5H and a bottom chamber 5B, and both ends of the head chamber 5H and the bottom chamber 5B are respectively attached at the base boom 2 and the frame 4 so as to be rotatable and able to drive the boom 1 in an up-and-down direction.

The aforementioned EPC valves 22, 23 includes working portions 22a, 23a connecting to a feedback command section 18 of the command control system. Such working portions 22a, 23a send oil with pilot pressure corresponding to the command value from the feedback command section 18 from the EPC valves 22, 23 to the directional control valve 21. Pilot pressure driving sections 21a, 21e provided at both ends of the directional control valve 21 conduct the switching among a descending portion 21b, a holding portion 21c, and an ascending portion 21d of the directional control valve 21 by driving a spool valve (not illustrated in the drawing) or the like corresponding to a pilot pressure, and drives the boom cylinder 5 in an up-and-down direction.

The command control system is defined by pressure sensors 11H, 11B for detecting the pressure of the boom 1, a lever turning degree coefficient calculating section 17 for calculating the coefficient corresponding to the operation of a lever 19 by an operator, an acceleration compensating value operating section 13 for calculating an acceleration compensating value, and a feedback command section 18 for outputting an acceleration feedback command value to the EPC valves 22, 23. The aforementioned pressure sensors 11H, 11B connect to the head chamber 5H and the bottom chamber 5B of the boom cylinder 5 and detect pressures PH, PB. The acceleration compensating value is calculated based on the pressures (the pressures PH and PB) of the boom 1 and the value of the lever turning degree coefficient calculating section 17. Further, an acceleration feedback command value can be obtained from an acceleration compensating value and the command value by the operation of the lever 19. The acceleration compensating value operating section 13 has a cylinder thrusting force calculating section 14 and an acceleration compensating value calculating section 16. It is preferable to provide a filter 15 (such as, a band-pass filter) between the cylinder thrusting force calculating section 14 and the acceleration compensating value calculating section 16.

Figure 2:
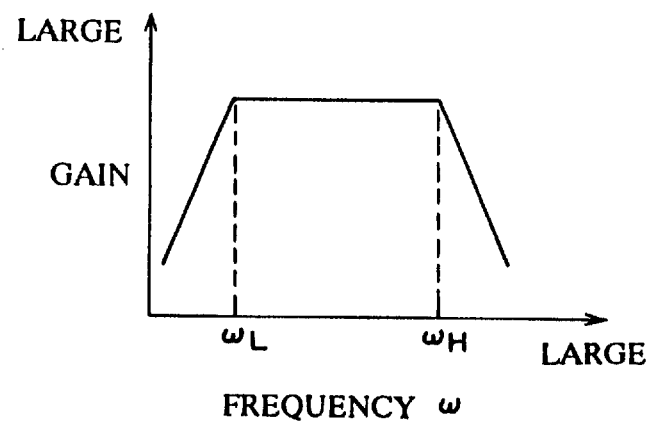
FIG. 2 is a graph showing a gain characteristic of the band-pass filter relating to an embodiment.

The operation of the aforementioned structural arrangement is hereinafter described. In the cylinder thrusting force calculating section 14, cylinder thrusting force F (F=PB·AB−PH·AH) is calculated from the pressures PH, PB detected in the pressure sensors 11H, 11B, and the sectional areas AH, AB of the head chamber 5H and the bottom chamber 5B of the boom cylinder 5. Since this cylinder thrusting force F includes noise and a direct-current component, it is preferable to filter them with the filter 15. The filter 15 of the present embodiment is a band-pass filter having a gain characteristic of a substantially trapezoidal form, as shown in FIG. 2. A frequency ω at a cutting point ωH is intended to cut a noise component so that the value of higher frequencies than the frequency subjected to vibration suppression may be set, and in the present embodiment, the value of about 30 Hz is set. For a cutting point ωL, a value which cuts the influence of the acceleration of gravity may be set, and the value is about 0.3 Hz. A cylinder thrusting force Ff which has been processed in this filter 15 is inputted to the acceleration compensating value calculating section 16.

Figure 3:
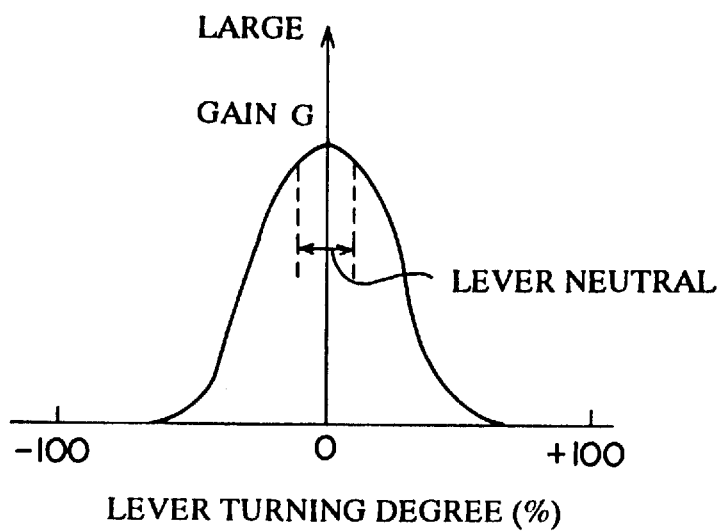
FIG. 3 is a graph showing the relationship between the lever turning degree and the gain relating to an embodiment.

On the other hand, a lever operation command value S by an operation of the lever 19 by an operator is inputted to the lever turning angle coefficient calculating section 17. This lever operation command value S corresponds to the lever turning degree in the operation of the lever 19, and FIG. 3 shows the relationship between a lever turning degree and gain G. The gain G which is a lever turning degree coefficient is calculated to be a function which has the maximum value (for example, G=1) when the lever is in a neutral position with a lever turning degree of about 0%, and has a small value (for example, 0) when the lever turning degree is +100% (for example, at the full stroke position for the ascent of the boom 1) and when the lever turning degree is −100% (for example, at the full stroke position for the descent of the boom 1). This calculated gain G is inputted to the acceleration compensating value calculating section 16.

In the acceleration compensating value calculating section 16, an acceleration compensating value K (K=Ff·G) is calculated by multiplying the cylinder thrusting force Ff which has gone through the filter processing by the gain G, and is outputted to the feedback command section 18. Then the feedback command section 18 obtains an acceleration feedback command value V based on the lever operation command value S by the operation of the lever 19 and the acceleration compensating value K and outputs this acceleration feedback command value V to the EPC valves 22, 23 as a current value. As for this output, for example, the value of the lever operation command value S from which the acceleration compensating value K is subtracted (negative feedback) (V=S−K) is outputted as an acceleration feedback command value V. When V is less than 0 (V<0), V is outputted to the working portion 23a of the EPC valve 23, and when V is 0 or more (V≧0), V is outputted to the working portion 22a of the EPC valve 22 in order to suppress vibration by driving the boom 1 in an up-and-down direction by the medium of the directional control valve 21 and the boom cylinder 5.

Figure 4A:
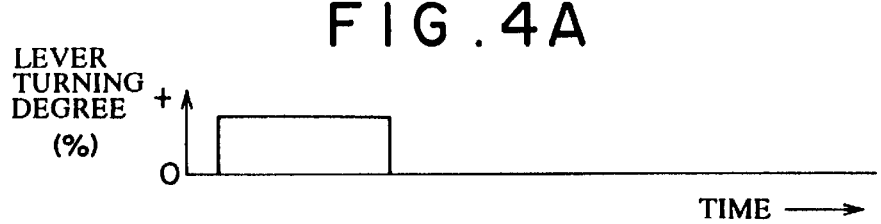
FIGS. 4 A, 4 B, and 4 C are graphs illustrating the change of the residual vibration immediately after the completion of the operation relating to an embodiment; and more particularly, FIG. 4 A is a graph showing a lever turning degree, FIG. 4 B is a graph showing a feedback command value outputted corresponding to a lever turning degree or the like, and FIG. 4 C is a graph showing the change of a boom angle.
Figure 4B:
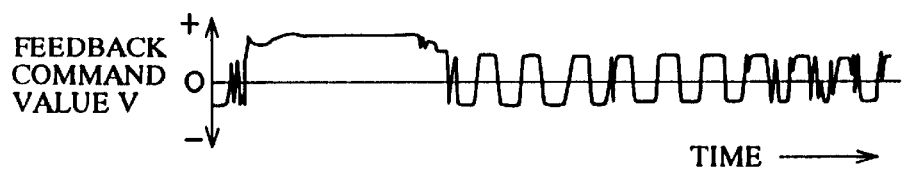
Figure 4C:
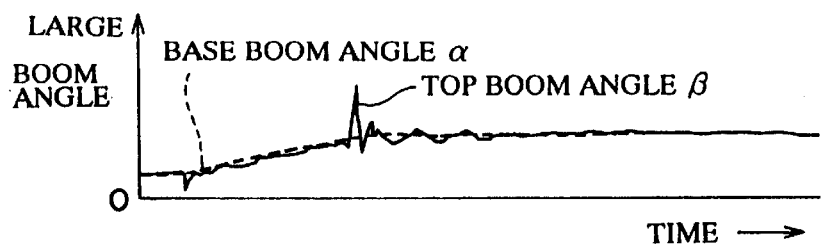
Figure 5A:
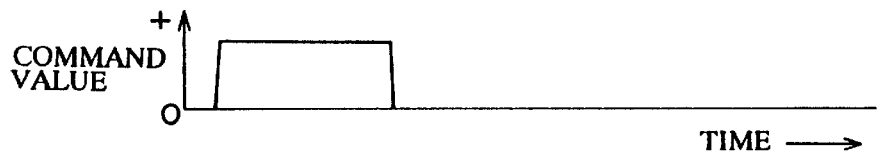
FIGS. 5 A and 5 B are graphs illustrating the change of the residual vibration immediately after the completion of the operation when the vibration is not suppressed; and more particularly, FIG. 5 A is a graph showing a command value outputted corresponding to a lever turning degree, and FIG. 5 B is a graph showing the change of a boom angle.
Figure 5B:
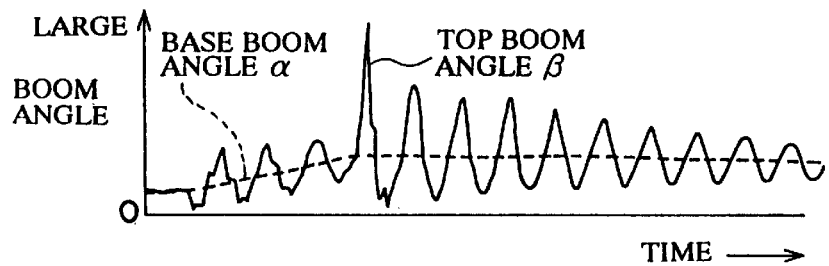

Then, regarding the change of the residual vibration immediately after the completion of each operation (such as, an abrupt acceleration or the like), the measurement results in the present embodiment are shown in FIGS. 4 A, 4 B and 4 C, and the measurement results in which the vibration is not suppressed are shown in FIGS. 5 A and 5 B. Such measurements were conducted when the operation was finished by halting the boom 1 after the boom 1 has ascended, and the lever turning degree 0% corresponds to the neutral position. A base boom angle α and the top boom angle β are the angles to the ground which are measured by attaching an angle sensor to the boom 1 shown in FIG. 1. As can be seen from the graphs of the measurement results, in the present embodiment, the vibration of the top boom angle β is small by the acceleration feedback command value V even in an ascending operation. The vibration of the top boom is suppressed in an extremely good condition, especially by the acceleration feedback command value V immediately after the completion of an operation (the lever being in the neutral position). Accordingly, the residual vibration of a suspended load or the like is reduced, and an ordinary feeling by the operator of the lever operation can be obtained while operating with an abrupt acceleration or the like so that the response does not deteriorate. As for the acceleration feedback command value V from the feedback command section 18, even if the value with the larger absolute value is selected by comparing the lever operation command value S with the acceleration compensating value K and is outputted, the residual vibration is effectively suppressed.

Figure 6:
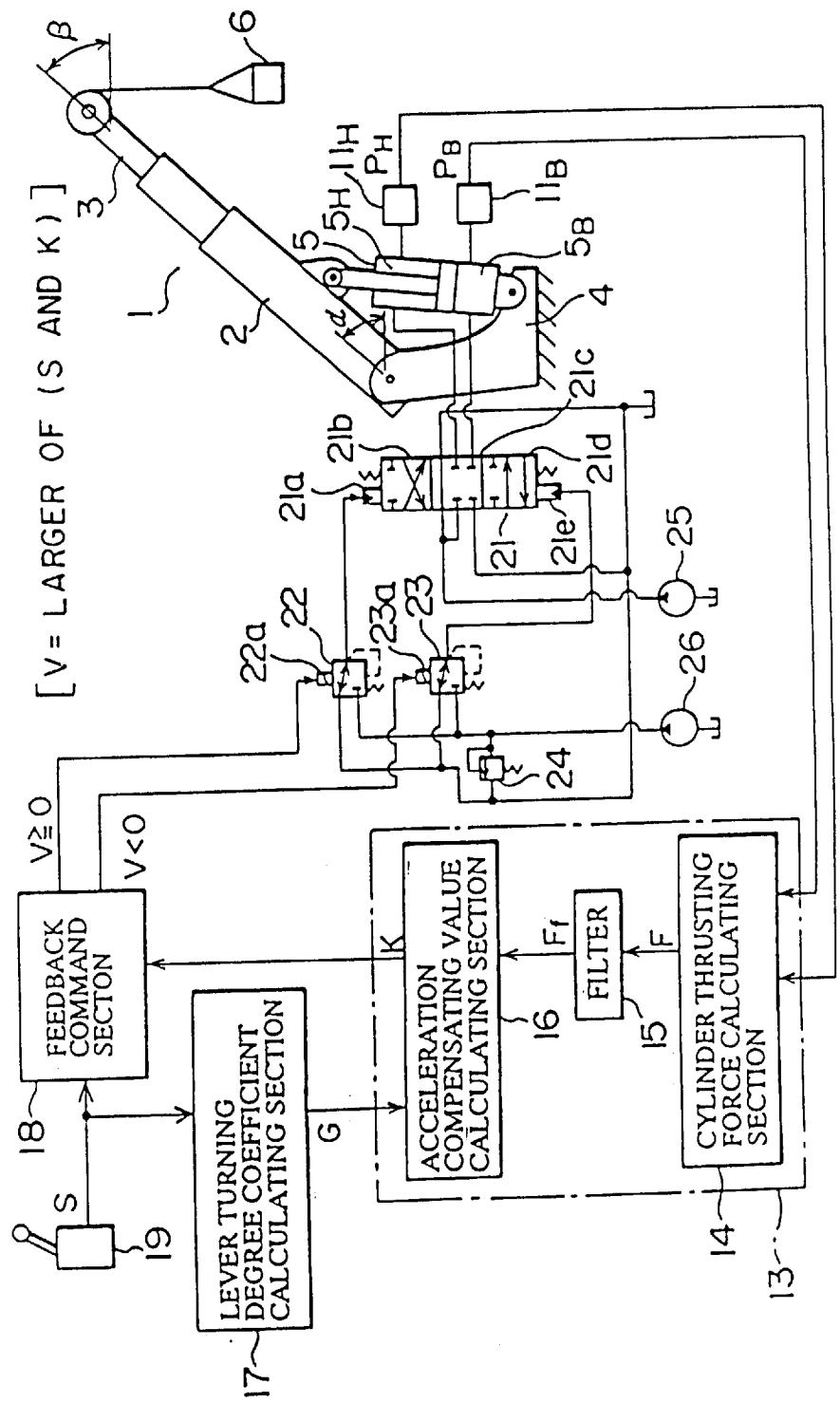
FIG. 6 is another general explanatory view of the device for suppressing vibration of a working machine relating to another embodiment of the present invention.

FIG. 6 is yet another general explanatory view of the device, similar to that described above with respect to FIG. 1 for suppressing vibration of a working machine relating to another embodiment of the instant invention, except that in this embodiment, the acceleration feedback command value V is the value with a larger absolute value as a result of the comparison between the lever operation command value S and the acceleration compensating value K.

As described above, in the present invention, the feedback gain corresponding to the operation lever turning degree by an operator is variable. Also, when the lever is in a neutral position, a feedback control is conducted with a gain having a large value so that the residual vibration immediately after the completion of an operation can be reduced over a short period of time. Thus, by suppressing the residual vibration immediately after the completion of the operation which is one of the types of vibrations operators hate most (i.e., residual vibration at a range of 1 to 2 Hz), a good operation feeling by the operator and ride comfort can be obtained. Further, the vibration width at the endmost portion of the working machine is small so that safe workability can be obtained. When the absolute value of the lever turning degree (which ascends and descends the working machine at high speed) is large, the feedback gain is small so that the effect of suppressing vibration becomes small and corresponds extremely well to the conventional operation feeling of an operator. Therefore, both the response to the lever operation or the like, and the excellent suppression of residual vibration are satisfied.

Although the device and method for suppressing vibration of a working machine relating to the present invention is described in detail above, the present invention is not limited to the above-described embodiments. For example, as for an oil hydraulic actuator, an oil hydraulic motor may be used, and a working machine to which the present invention is applied may be any working machine if it is driven by an oil hydraulic actuator.

In the present embodiment, the pressure sensor is disclosed as the working machine acceleration detecting means. However, an acceleration sensor can be used as the working machine acceleration detecting means, and by attaching this acceleration sensor to the working machine, the detected value may be inputted to the acceleration compensating value operating section in order to conduct the operation. Further, it is needless to say that the lever turning degree coefficient may be obtained from various functions, patterns or the like when needed.

Accordingly, the present invention is useful as a device and method for suppressing residual vibration of a working machine which can obtain lever operating performance without degrading responsiveness and can suppress the residual vibration generated immediately after the completion of the operation (such as, an abrupt acceleration of a working machine) to be reduced over a short period of time.

The above description is included to illustrate the preferred embodiments and the operations thereof, and is not intended to limit the scope of the invention. The scope of the invention is to be limited only by the following claims. From the above discussion, many variations are apparent to one skilled in the art which would yet be encompassed by the spirit and scope of the invention.

I claim:

1. A device for suppressing vibration of a working machine having an oil hydraulic actuator for driving the working machine with a lever, an oil hydraulic pump for supplying hydraulic oil to said oil hydraulic actuator, a directional control valve provided between said oil hydraulic pump and said oil hydraulic actuator, and electromagnetic proportional pressure control valves for switching and controlling said directional control valve for suppressing vibration of a working machine in which vibration is controlled by outputting feedback command value based on the acceleration of said working machine to said electromagnetic proportional pressure control valves, said device comprising:

- a working machine acceleration detecting means for detecting the acceleration of said working machine driven by said oil hydraulic actuator;
- a lever turning degree coefficient calculating means for calculating a coefficient corresponding to the lever turning degree from a lever operation command value by an operator;
- an acceleration compensating value operating means for generating an acceleration compensating value from an acting force calculated from said working machine acceleration and said lever turning degree coefficient; and
- a feedback command means for obtaining an acceleration feedback command value from said acceleration compensating value and said lever operation command value and for outputting said acceleration feedback command value to said electromagnetic proportional pressure control valve,
- wherein said acceleration feedback command value is a value of said lever operation command value from which said acceleration compensating value is subtracted, and
- wherein said lever turning degree coefficient is a coefficient which reaches maximum value at said lever operation command value with the lever in a neutral position.

2. A device for suppressing vibration of a working machine according to claim 1, wherein said acceleration compensating value is a value resulting from the multiplication of said acting force by said lever turning degree coefficient.

3. A method for suppressing vibration of a working machine with a lever, comprising the steps of:

- detecting a value of at least an acceleration of said working machine driven by an oil hydraulic actuator; and
- driving and controlling said oil hydraulic actuator by a feedback command value based on said lever operation command value from which an acceleration compensating value is subtracted,
- wherein said acceleration compensating value is based on said detected value and a lever turning degree coefficient corresponding to a lever operation, and
- wherein said lever turning degree coefficient is a coefficient which reaches maximum value at said lever operation command value with the lever in a neutral position.

4. A device for suppressing vibration of a working machine having an oil hydraulic actuator for driving the working machine, an oil hydraulic pump for supplying hydraulic oil to said oil hydraulic actuator, a directional control valve provided between said oil hydraulic pump and said oil hydraulic actuator, and electromagnetic proportional pressure control valves for switching and controlling said directional control valve for suppressing vibration of a working machine in which vibration is controlled by outputting feedback command value based on the acceleration of said working machine to said electromagnetic proportional pressure control valves, said device comprising:

- a working machine acceleration detecting means for detecting the acceleration of said working machine driven by said oil hydraulic actuator;
- a lever turning degree coefficient calculating means for calculating a coefficient corresponding to the lever turning degree from a lever operation command value by an operator;
- an acceleration compensating value operating means for generating an acceleration compensating value from an acting force calculated from said working machine acceleration and said lever turning degree coefficient; and
- a feedback command means for obtaining an acceleration feedback command value from said acceleration compensating value and said lever operation command value and for outputting said acceleration feedback command value to said electromagnetic proportional pressure control valve.

* * * * *